United States Patent [19]

Stewart et al.

[11] 4,313,075

[45] Jan. 26, 1982

[54] PROGRAMMABLE ELECTRONIC SPEED CONTROL

[75] Inventors: William G. Stewart, Pennington, N.J.; David Lawhon, Doylestown, Pa.

[73] Assignee: Refreshment Machinery Incorporated, Warminster, Pa.

[21] Appl. No.: 47,959

[22] Filed: Jun. 11, 1979

[51] Int. Cl.³ .............................................. H02P 7/58
[52] U.S. Cl. ................................. 318/722; 318/723; 318/807; 318/812; 318/345 H; 222/63
[58] Field of Search ............... 99/323.2, 323; 318/807, 318/812, 341, 345 R, 345 C, 345 D, 345 G, 345 H, 722, 723; 222/63, 129.1–129.4

[56] References Cited

U.S. PATENT DOCUMENTS

| 2,536,400 | 1/1951 | Thompson | 99/323.2 |
| 3,307,094 | 2/1967 | Ogle | 318/341 |
| 3,659,169 | 4/1972 | Waddicor | 318/807 |
| 4,037,757 | 7/1977 | Green | 222/129.2 |

Primary Examiner—J. V. Truhe
Assistant Examiner—Eugene S. Indy
Attorney, Agent, or Firm—Seidel, Gonda, Goldhammer & Panitch

[57] ABSTRACT

A programmable electronic speed control for controlling the speed of a motor responsive to an ac signal source. A triac switch is interposed between the ac signal source and the motor. A programmable digital counter is connected between the ac signal source and the triac switch. The programmable counter counts zero voltage crossings of the ac signal generated by the ac signal source and repetitively causes the triac switch to alternately pass and block selectable numbers of cycles of the ac signal to the motor. The speed of the motor is determined by the relationship between the selectable numbers of cycles of the ac signal which are alternately passed and blocked by the triac switch. The speed control is particularly suited for use in controlling the pump motor and/or the program timer motor in a beverage dispensing machine.

17 Claims, 6 Drawing Figures

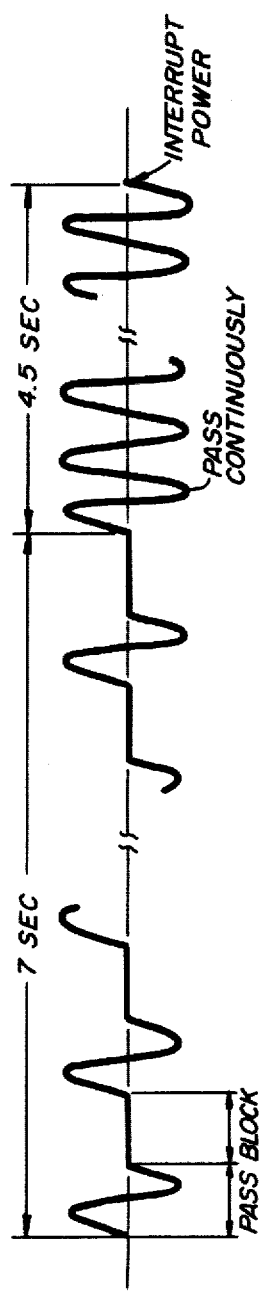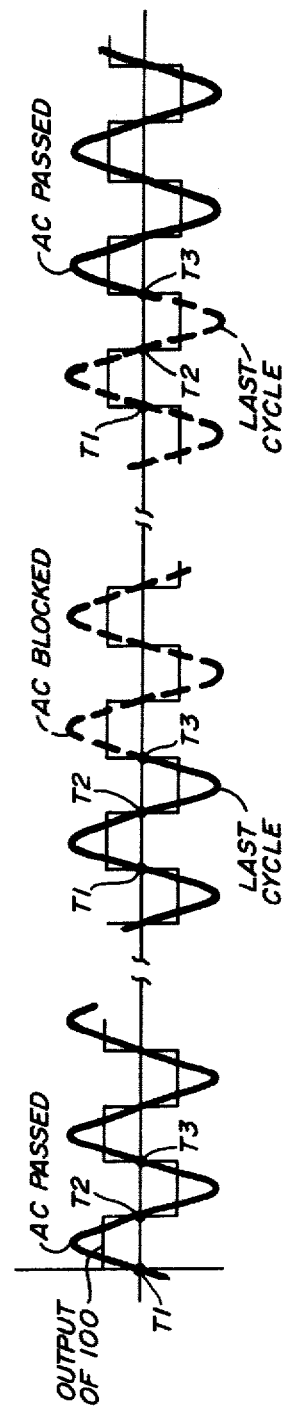

PROGRAMMABLE ELECTRONIC SPEED CONTROL

BACKGROUND OF THE INVENTION

The present invention is directed to a programmable electronic speed control for controlling the speed of a motor responsive to an ac signal source without altering the amplitude of the ac signal received by the motor.

In particular, the invention is directed to a programmable electronic speed control wherein the speed of the motor is controlled by alternately passing and blocking selectable numbers of cycles of the ac signal to the motor, repetitively, without altering the amplitude of the passed ac signal.

The invention is intended for use in controlling the operation of ac motors of various types at reduced speeds. Such motors would include induction motors of any type, including the shaded pole and permanent split capacitor type, and synchronous (reluctance or hysteresis) motors.

In general, induction motors do not lend themselves to speed control over a wide range of speeds and, where the motor load is other than exponential, at reduced speeds. Synchronous motors have proven impossible to operate at less than synchronous speed.

Presently, low cost induction motor speed controls, such as variable transformers or solid state triac phase controlled switches, achieve motor speed reduction by reducing the actual or apparent motor input voltage. In such speed controls, motor speed tends to vary widely with changing loads unless the motor speed is sensed and a feedback control is utilized to continuously adjust the voltage applied to the motor.

In cases where the motor is operated at a fixed reduced voltage, the motor may fail to start since the starting torque is directly related to the square of the voltage reduction ratio which may be too low. This relationship is exemplified by the following equation:

$$T_R = (V_R/V)^2 \times (T)$$

where $T_R$ is the starting torque at reduced voltage, $(V_R/V)$ is the voltage reduction ratio, and $T$ is the starting torque at the design voltage $V$.

In speed control systems employing phase control, reduction of the voltage applied to the motor produces substantial conducted and radiated radio frequency interference, making necessary costly suppression components.

Synchronous motors, in particular, cannot be operated at reduced speeds, less than synchronous speed, according to conventional voltage reduction techniques. The synchronous motor may simply stop, or fail to start, if the voltage applied to the motor is too low for operation at synchronous speed.

The present invention fills a gap in the industry for a low cost speed control which is not subject to the foregoing deficiencies. Speed control is exercised by alternately passing and blocking selectable numbers of cycles of the ac signal applied to the motor. The speed control is programmable and does not require reduction of the amplitude of the ac signal applied to the motor.

Since speed control is achieved by the invention by intermittent application of the full ac signal, torque developed at a controlled speed is comparable to the torque which would be developed by the motor at the same speed but at continuously applied line voltage. Under some transient conditions, the torque developed by the motor at the controlled speed can actually exceed the torque which would be developed by the motor at the same speed at continuously applied line voltage.

The present invention is particularly suited for use with motors which require substantial starting torque and which drive devices that are operated intermittently. The invention, however, can also be employed to control the speed of devices which are operated continuously.

SUMMARY OF THE INVENTION

Method and apparatus for controlling the speed of a motor responsive to an ac signal source. A switch is connected between the ac signal source and the motor. Programmable means, such as a programmable digital counter, is connected between the ac signal source and the switch. The programmable means repetitively causes the switch to alternately pass a first selectable number of cycles of the ac signal to the motor and block a second selectable number of cycles of the ac signal from reaching the motor. The speed of the motor is determined by the relationship between the first and second selectable numbers of cycles of the ac signal which are passed and blocked respectively by the switch.

The motor may be an induction motor operatively associated with a pump in a beverage dispensing machine wherein the pump delivers a beverage ingredient to a container. The first and second selectable numbers of cycles of the ac signal determines the speed of the motor and pump, hence the period of time during which the beverage ingredient is delivered by the pump to the container.

In addition, the motor may be a synchronous motor operatively associated with a cam program timer in a beverage dispensing machine. The normal cycle time of the timer can be greatly expanded by means of the invention and the motor can be operated at less than synchronous speed.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3A is a waveform of an ac signal having zero crossings which are counted by the electronic speed control in FIG. 1.

FIG. 3B is one example of a signal supplied by the invention to the pump motor in FIG. 2.

DETAILED DESCRIPTION OF THE INVENTION

Figure 1:
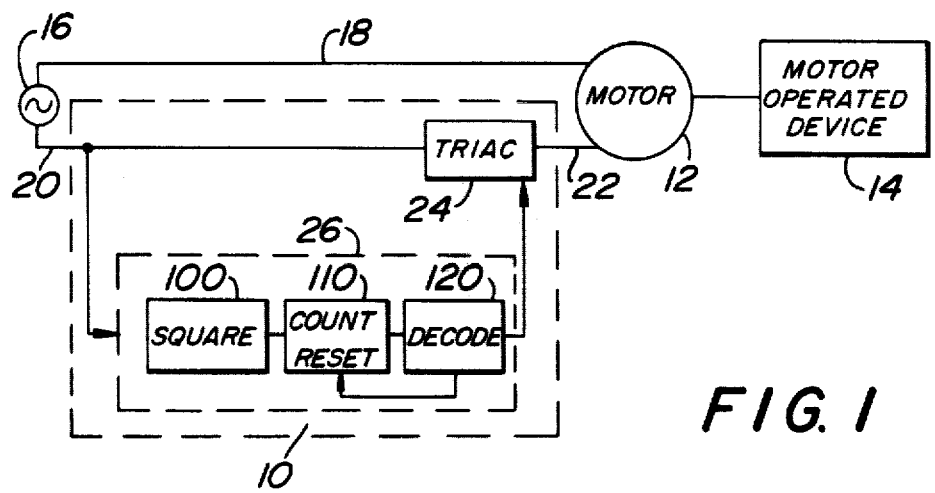
FIG. 1 is a block diagram of the programmable electronic speed control of the invention.

Referring to the drawings, wherein like numerals indicate like elements, there is shown in FIG. 1 a block diagram of the programmable electronic speed control 10 of the present invention. The electronic speed control 10 controls the speed of an ac motor 12 such as an induction motor or a synchronous motor which drives a device 14. The motor 12 may be a shaded pole or permanent split capacitor type induction motor. The motor may also be a universal AC/DC motor. The device 14 may be operated intermittently or continuously by the motor 12.

The winding of the motor 12 is energized by an ac signal source 16. The ac signal source 16 is connected to one side of the motor winding by a conductor 18. The ac signal source 16 is connected to the other side of the motor winding by conductor 20, electronic speed control 10 and conductor 22.

The electronic speed control 10 includes a bilateral switch 24 connected between conductors 20 and 22. Preferably, switch 24 is a triac and is designed as such in FIG. 1. However, other types of switches and switch arrangements may be used within the spirit and scope of the invention as would be obvious to a person of skill in the art.

A programmable digital counter 26 is connected between conductor 20 and the control input of triac 24. The programmable digital counter 26 counts crossings or transitions of the ac signal (appearing on conductor 20) through zero voltage. The counter 26 includes a signal shaping or squaring circuit 100 of conventional design which shapes or squares the ac signal on line 20 and reduces the voltage amplitude to levels compatible with digital logic. The output signal generated by circuit 100 is a pulse train which clocks a digital counter 110. See FIG. 3A. The stages of counter 110 are connected to a decoder circuit 120 which controls the state of triac 24 based on the count of counter 110. The programmable digital counter 26 is "programmed" by choosing appropriate logic for the decoder 120 such that the decoder changes state when a first selectable count is reached by counter 110 and then returns to its original state when a second selectable count is reached by the counter 110.

The programmable digital counter 26 causes the triac 24 to switch between conductive and non-conductive states based on the count of zero crossings of the ac signal in counter 110. Thus, the counter 26 maintains the triac 24 in a conductive state for a first number of counts of zero voltage crossings of the ac signal and then switches the triac to the non-conductive state for a second number of counts of zero voltage crossings of the ac signal. The counter 26 repeatedly counts zero voltage crossings of the ac signal on conductor 20 and switches the triac 24 between conductive and non-conductive states based on the counts.

The number of zero voltage crossings of the ac signal is correlated to the number of complete cycles of the ac signal. Thus, for each cycle of the ac signal, there are three zero voltage crossings. See FIG. 3A wherein the crossings are designated T1, T2 and T3. The counter 110 is clocked at the T1 and T3 crossings (positive edge transitions of pulse output of circuit 100) and ignores the T2 transition (negative edge transition). Accordingly, the counter 110 and decoder 120 cause the triac 24 to pass a first selectable number of complete cycles of the ac signal to the motor 12 until counter 110 is clocked by the T3 transition of the last cycle to be passed. At this time, the counter 110 and decoder 120 cause the triac to block a second selectable number of cycles of the ac signal until counter 110 is clocked by the T3 transition of the last cycle to be blocked. The decoder 120 then resets the counter 110. The triac 24 therefore repetitively passes and blocks selectable numbers of cycles of the ac signal to the motor 12 without altering the amplitude of the ac signal. Whenever the ac signal is passed to the motor 12, full line voltage is applied to the motor winding.

If desired, after a preselected number of zero crossings corresponding to a total number of passed and blocked cycles of the ac signal have been counted by counter 110, the decoder 120 can maintain the triac on continuously until power is interrupted. See FIG. 3B.

By alternately passing and blocking the ac signal on conductor 20, the motor 12 is operated at a reduced speed but without sacrificing motor torque. It should be noted, moreover, that the electronic speed control 10 operates the motor at reduced speeds without requiring any feedback loop or circuitry for sensing motor speed.

As previously indicated, the electronic speed control 10 is programmable. Thus, counter 26 is "programmed" as desired by appropriate choice of decoder 120 logic to alternately pass and block the desired numbers of cycles of the ac signal to control the speed of motor 12 over a relatively wide range of speeds. If the triac is to be maintained in the conductive and non-conductive states for alternate numbers of cycles of the ac signal which are equal and are binary multiples such as 1, 2, 4, 8, etc., an appropriate stage of the counter 110 may be used to directly control the triac and the decoder 120 need not be used for this purpose. For example, if the triac is alternately maintained on for one cycle and off for one cycle, repetitively, the first stage of the counter 110 may be used to directly control the triac.

In general, the counter 26 is programmed to obtain the desired speed of operation of the motor 12 depending on the particular application. Specific examples are given below.

Operation of Pump Motor

Figure 2:
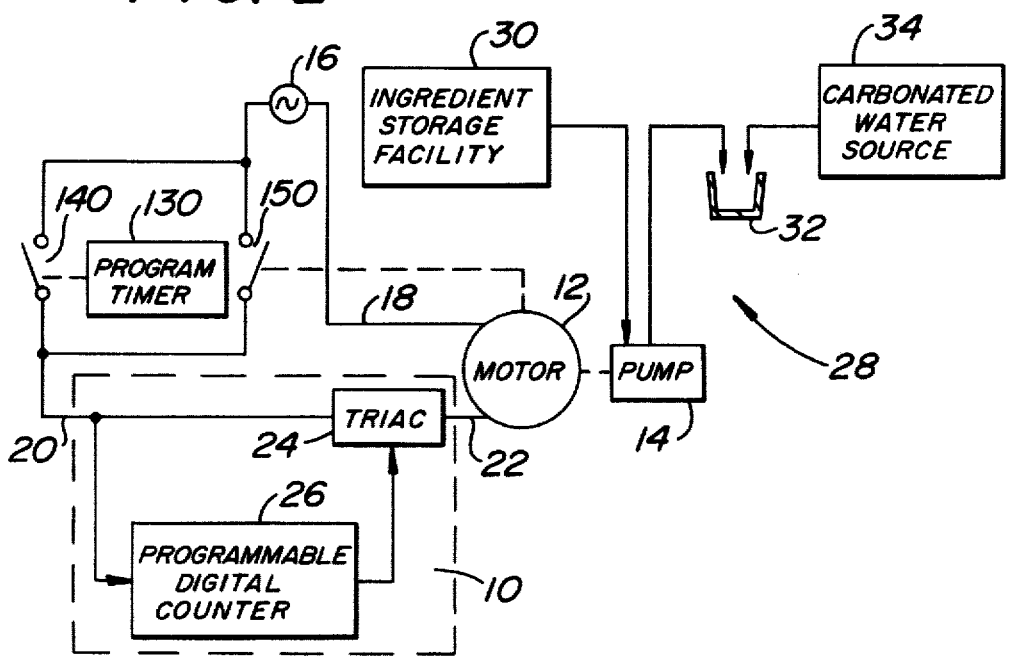
FIG. 2 is a block diagram of an application of the invention in controlling a pump which delivers a beverage ingredient in a beverage dispensing machine.

In one application of the invention, the electronic speed control was employed to control the speed of a shaded pole motor 12 in a beverage dispensing machine 28. See FIG. 2. The shaded pole motor 12 drove a bellows type pump 14 which pumped a syrup ingredient from a storage facility 30 to a beverage container 32. Syrup was delivered by the pump 14 to container 32 while carbonated water was introduced in the container from a source 34. Motor 12, pump 14, storage facility 30 and source 34 are well known elements of conventional beverage dispensing machines.

It is desirable for the pump 14 to deliver syrup to the container 32 as long as water is introduced into the container by source 34. This ensures thorough blending of the syrup and water as the container 32 is filled.

One complete operating cycle of the pump 14 is defined by the upstroke and downstroke of the pump. During the upstroke, the pump 14 delivered syrup to the container 32. During the downstroke, the pump 14 pumped syrup from the storage facility 30 to the pump chamber. The pump was capable of operating at a speed of 6.7 complete operating cycles per minute. One complete cycle, that is, one upstroke and one downstroke, required approximately 9 seconds. The upstroke and the downstroke of the pump were of the same time durations, namely, 4.5 seconds.

One complete cycle of operation of the beverage dispensing machine 28 required 12 seconds. The period of time required for the source 34 to deliver a full charge of water to the container 32 was 8 seconds. To achieve thorough blending of the syrup and water, it was desirable to deliver syrup to the container 32 during the full 8 second interval during which water was introduced into the container.

If the pump 14 were operated at a reduced speed to expand the time during which syrup were introduced into the container 32 from 4.5 to 8 seconds, the time for completion of one cycle of operation of the pump 14 would be 16 seconds. This, of course, would be unacceptable since the time required for one complete cycle of the beverage dispensing itself was no more than 12 seconds.

The electronic speed control 10 of the present invention was connected between conductors 20 and 22 to expand the time during which the pump 14 delivered syrup to container 32 without affecting the time required by the pump 14 to receive a new charge of syrup from the storage facility 30. This was accomplished by operating the pump 14 at reduced speed during the upstroke while operating the pump at normal speed during the downstroke.

In the example described herein, a conventional cam program timer 130 in the beverage dispensing machine operated a switch 140, on the application of power to the machine, to initially provide the ac signal to the counter 26 and triac 24. See FIG. 2. The programmable digital counter 26 was "programmed" by using the output of the first stage of the counter 110 to cause the triac 24 to alternately pass and block one complete cycle of the ac signal on conductor 20, repetitively, for 420 cycles of the ac signal. See FIG. 3B. As alternate cycles of the ac signal were transmitted through triac 24 to pump motor 12, rotation of the motor shaft closed a pump limit switch 150 to provide an alternate path for the ac signal to the counter 26 and triac 24. Shortly thereafter, the program timer opened swich 140. The switches 140 and 150 are conventional elements in a beverage dispensing machine which are operated by a camming action by program timer 130 and pump motor 12, respectively.

During the upstroke of the pump, the motor 12 was operated in response to alternate cycles of the ac signal under control of the counter 26 and triac 24 for 420 cycles of the ac signal as shown in FIG. 3B. The decoder 120 detected the count in counter 110 which indicated the completion of 420 cycles of the ac signal. After completion of the 420 cycles of the ac signal, the programmable digital counter 26 maintained the triac 24 in the conductive state until power was interrupted, whereupon the counter was reset to begin a count of 420 cycles upon the next application of power. Power was interrupted by opening switch 150 by a camming action at the bottom of the downstroke of pump 14 in response to rotation of the pump motor shaft.

Accordingly, during the pump upstroke, the pump was operated at reduced speed for 7 seconds (420 cycles) and the pump delivered syrup to the container 32 while the source 34 introduced water into the container. Thereafter, during the downstroke of the pump, a fresh charge of syrup was pumped from storage facility 30 for 4.5 seconds. The total pump cycle time was therefore 11.5 seconds, within the required 12 second cycle time of the beverage dispensing machine.

In the previous description of operation of the pump motor 12, transition from the mode in which the motor was operated at reduced speed (by alternately passing and blocking each cycle of the ac signal) to the mode in which the motor was continuously operated in response to the unblocked ac signal was effected by counting zero voltage crossings of the ac signal corresponding to 420 cycles or 7 seconds. The transition between modes should occur at the completion of the upstroke of the pump or the start of the downstroke of the pump.

Figure 4:
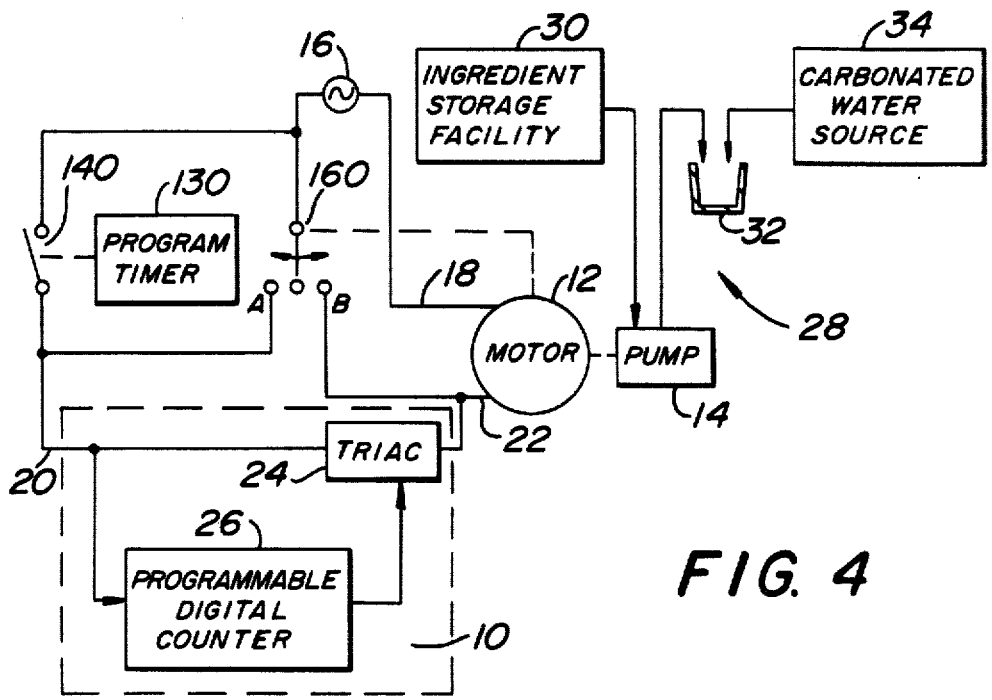
FIG. 4 is a block diagram of an application of the invention in controlling a synchronous motor which drives a cam program timer in a beverage dispensing machine.

To ensure that the transition between modes occurs at exactly the right time, the arrangement in FIG. 4 may be employed. In this arrangement, the limit switch 150 is replaced by a SPDT switch 160 which is connected at terminals A and B to lines 20 and 22 respectively.

On the application of power, the program timer operates as previously described to close switch 140. Accordingly, the ac signal is supplied to counter 26 and triac 24. The triac 24 alternately passes and blocks selectable numbers of cycles of the ac signal to pump motor 12. As the pump motor shaft rotates, it closes limit switch 160 on terminal A by a camming action, and the switch provides an alternate path for the ac signal to counter 26 and triac 24. Shortly thereafter, the program timer 130 opens switch 140.

At the completion of the pump upstroke, the pump motor shaft transfers switch 160 from terminal A to terminal B by a camming action. The ac signal is now supplied directly to the pump motor 12 and power is removed from the triac 24. Accordingly, the pump 14 executes a downstroke under continuous operation of the motor 12. At the completion of the downstroke, the pump motor shaft opens switch 160 as shown in FIG. 4 by suitable camming action. Power is therefore removed from the motor 12. On the next application of power, the foregoing operations are repeated.

Operation of Program Timer Motor

In another application of the invention, the device 14 in FIG. 1 was a cam program timer which operated a series of switches in a beverage dispensing machine. The program timer was driven by a 6 rpm synchronous motor, which provided a 10 second machine cycle (one complete motor shaft rotation).

The electronic speed control 10 was programmed to operate the synchronous motor 12 at various speeds to obtain different cycle times of the program timer 14. The programs for the speed control 10 and the corresponding cycle times of the program timer are indicated in Table 1 below.

TABLE 1

| Program | Cycle Time (sec) | |
|---|---|---|
| | Measured | Predicted* |
| 60 hz uninterrupted | 9.9 | 10 |
| 8 ac cycles passed, 6 ac cycles blocked | 17.5 | 17.5 |
| 1 ac cycle passed, 15 ac cycles blocked | 159.7 | 160 |
| 1 ac cycle passed, 15 ac cycles blocked** | 160.1 | 160 |
| 1 ac cycle passed, 1 ac cycle blocked | 20.1 | 20 |

*predicted time = Tcycle/(% time on) where Tcycle is the time originally required for one complete shaft rotation in seconds and "% time on" is the number of ac cycles passed in one complete pass-block event divided by the total number of ac cycles in the complete pass-block event
**heavy friction load applied to motor shaft As noted in Table 1, the measured cycle time compared accurately to the predicted cycle time for each program. In the case of the program wherein 1 cycle of the ac signal was passed and then 15 cycles of the cycle were blocked, repetitively, the synchronous motor was successfully operated at constant, substantially reduced speed even when a significant change in load was applied to the motor shaft.

The invention may also be employed in controlling the operation of a synchronous program timer motor at plural selectable speeds determined by the desired cycle time for the beverage dispensing machine. See FIG. 5. In this application, the beverage dispensing machine can dispense a hot or cold beverage. The hot beverage would be dispensed over a shorter interval of time (machine cycle time) than the cold beverage.

Figure 5:
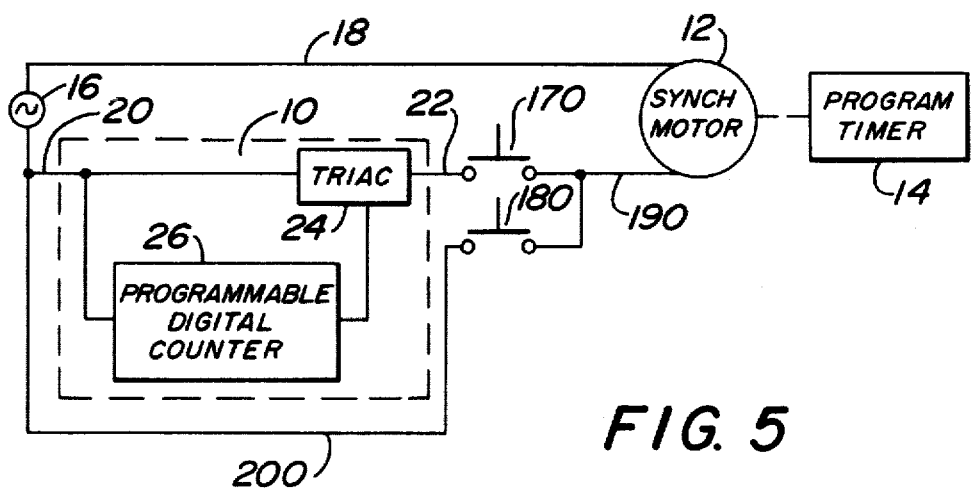
FIG. 5 is a block diagram of an application of the invention in selectively controlling the synchronous motor in FIG. 2 at more than one speed.

Referring to FIG. 5, a pair of pushbutton switches 170, 180 are connected to line 190. Switch 170 is connected to the triac output line 22. Switch 180 is connected through line 200 to the ac source 16. Switch 170 is depressed to operate the machine in dispensing a cold beverage. Switch 180 is depressed to operate the machine in dispensing a hot beverage.

When switch 170 is depressed (closed) and switch 180 is not depressed (open), the triac 24 alternately passes and blocks selectable numbers of cycles of the ac signal from source 16, under control of programmable counter 26, to the motor winding via line 190. The motor 12 therefore operates the program timer 14 at reduced speed.

When switch 180 is depressed (closed) and switch 170 is not depressed (open), the output of triac 24 is not transmitted to the motor winding. Instead, the ac signal from source 16 is continuously supplied to the motor winding via lines 200 and 190. Synchronous motor 12 therefore operates program timer 14 at normal speed.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus for controlling the relative speeds of the upstroke and downstroke of a pump driven by a motor responsive to an ac signal source in a beverage dispensing machine wherein the pump delivers a beverage ingredient to a beverage container during the upstroke and wherein the pump withdraws the beverage ingredient from a storage facility during the downstroke, comprising:
   switch means connected between said ac signal source and said motor,
   programmable means connected between said ac signal source and said switch means for causing said switch means to pass a first number of cycles of said ac signal to said motor and for causing said switch means to block a second number of cycles of said ac signal from reaching said motor during the upstroke of said pump and for continuously passing said ac signal to said motor during the downstroke of said pump,
   whereby the speed of said motor during the upstroke of said pump is determined by the relationship between said first and second numbers of cycles of said ac signal.

2. Apparatus for controlling the relative speeds of the upstroke and downstroke of a pump driven by a motor responsive to an ac signal source in a beverage dispensing machine wherein the pump delivers a beverage ingredient to a beverage container during the upstroke and wherein the pump withdraws the beverage ingredient from a storage facility during the downstroke, comprising:
   switch means connected between said ac signal source and said motor,
   programmable means responsive to zero crossings of said ac signal for maintaining said switch means in a conductive state for a first number of cycles of the ac signal generated by said ac signal source and for maintaining said switch means in a non-conductive state for a second number of cycles of said ac signal during the upstroke of the pump and for continuously passing said ac signal to said motor during the downstroke of the pump
   whereby the speed of said motor during the upstroke of said pump is determined by the relationship between said first and second numbers of cycles of said ac signal.

3. Apparatus for controlling the relative speeds of the upstroke and downstroke of a pump driven by a motor responsive to an ac signal in a beverage dispensing machine wherein the pump delivers a beverage ingredient to a beverage container during the upstroke and wherein the pump withdraws the beverage ingredient from a storage facility during the downstroke, comprising:
   switch means connected between said ac signal source and said motor,
   a programmable digital counter for counting zero crossings of said ac signal and for causing said switch means to pass a first number of cycles of said ac signal to said motor and for causing said switch means to block a second number of cycles of said ac signal from reaching said motor based on the count of said zero crossings of said ac signal during the upstroke of said pump and for continuously passing said ac signal to said motor during the downstroke of the pump,
   whereby the speed of said motor during the upstroke of said pump is determined by the relationship between said first and second numbers of cycles of said ac signal.

4. The apparatus according to claim 1, 2 or 3 wherein said motor is an induction motor.

5. The apparatus according to claim 1, 2 or 3 wherein said motor is a synchronous motor.

6. The apparatus according to claim 1, 2 or 3 wherein said switch means is a triac.

7. Apparatus for controlling the lengths of time of the upstroke and downstroke of a pump in a beverage dispensing machine wherein said pump delivers a beverage ingredient to a beverage container during an upstroke and wherein said pump withdraws said beverage ingredient from a storage facility during a downstroke, said pump being driven by a motor responsive to an ac signal source, comprising:
   switch means connected between said ac signal source and said motor,
   programmable means connected between said ac signal source and said switch means for repetitively causing said switch means to alternately pass and block the ac signal generated by said ac signal source to said motor for first and second intervals of time, respectively, during said upstroke of said pump and for causing said switch means to continuously pass said ac signal to said motor during said downstroke of said pump, said length of time of the upstroke of said pump being determined by the relationship between said first and second intervals of time, and means responsive to rotation of said motor for automatically preventing said ac signal from reaching said motor at the completion of the downstroke of said pump.

8. The apparatus according to claim 7 wherein said motor is a shaded pole motor.

9. The apparatus according to claim 7 wherein said pump is a bellows pump.

10. Apparatus for controlling the length of time of the upstroke and downstroke of a pump in a beverage dispensing machine wherein said pump delivers a beverage ingredient to a beverage container during an upstroke and wherein said pump withdraws said beverage ingredient from a storage facility during a downstroke, said pump being driven by a motor responsive to an ac signal source, comprising:

switch means connected between said ac signal source and said motor, programmable means connected between said ac signal source and said switch means for repetitively causing said switch to alternately pass and block the ac signal generated by said ac signal source to said motor for first and second intervals of time, respectively, during said upstroke of said pump, means responsive to rotation of said motor for automatically preventing said ac signal from reaching said programmable means at the completion of the upstroke of said pump and for continuously passing said ac signal to said motor during the downstroke of said pump, and means responsive to rotation of said motor for automatically preventing said ac signal from reaching said motor at the completion of the downstroke of said pump.

11. Apparatus for controlling the cycle time of a program timer in a beverage dispensing machine, said program timer being driven by a motor responsive to an ac signal source, comprising:

switch means connected to said ac signal source, programmable means connected between said ac signal source and said switch means for causing said switch means to alternately pass and block the ac signal generated by said ac signal source to said motor for first and second intervals of time respectively, whereby the cycle time of said program timer is determined by the relationship between said first and second intervals of time.

12. The apparatus according to claim 11 wherein said motor is a synchronous motor.

13. Apparatus for controlling the cycle time of a program timer in a beverage dispensing machine, said program timer being driven by a motor responsive to an ac signal source, comprising:

switch means connected to said ac signal source, programmable means connected between said ac signal source and said switch means for causing said switch means to alternately pass and block the ac signal generated by said ac signal source to said motor for first and second intervals of time respectively, whereby the cycle time of said program timer is determined by the relationship between said first and second intervals of time, and means for selectively connecting said motor to said switch means to obtain a first cycle time of said program timer and for connecting said motor to said ac signal source to obtain a second cycle time of said program timer.

14. Method of controlling the relative speeds of the upstroke and downstroke of a pump driven by a motor responsive to an ac signal in a beverage dispensing machine wherein beverage ingredient is delivered to a beverage container during the pump upstroke and wherein beverage ingredient is withdrawn from a storage facility during the pump downstroke, comprising:

alternately passing a first number of cycles of said ac signal to said motor and blocking a second number of cycles of said ac signal from reaching said motor during the upstroke of said pump, continuously passing said ac signal to said motor during the downstroke of said pump, whereby the speed of said motor during the upstroke of said pump is determined by the relationship between said first and second numbers of cycles.

15. Method of controlling the lengths of time of the upstroke and downstroke of a pump in a beverage dispensing machine, said pump being driven by a motor responsive to an ac signal, comprising:

alternately passing a first number of cycles of said ac signal to said motor and blocking a second number of cycles of said ac signal from reaching said motor, during said upstroke of said pump, continuously passing said ac signal to said motor during said downstroke of said pump, and preventing said ac signal from reaching said motor at the completion of the downstroke of said pump.

16. Method of controlling the cycle time of a program timer in a beverage dispensing machine, said program timer being driven by a motor responsive to an ac signal source, comprising:

controlling the speed of said motor by alternately passing a first number of cycles of said ac signal to said motor and blocking a second number of cycles of said ac signal from reaching said motor, whereby the cycle time of said program timer is determined by the relationship between said first and second intervals of time.

17. Apparatus for controlling the speed of a motor responsive to an ac signal source wherein said motor is operatively associated with a program timer in a beverage dispensing machine which determines the time for completion of at least one cycle of operation of the beverage dispensing machine, comprising:

switch means connected between said ac signal source and said motor, counting means for counting the number of cycles of said ac signal, means for causing said switch means to pass said ac signal until a first number of cycles is counted by said counting means, means for causing said switch means to block said ac signal from reaching said motor after said first number of cycles is counted by said counting means until a second number of cycles is counted by said counting means, means for resetting said counting means when said second number of cycles is counted, whereby the speed of said motor is determined by the relationship between said first and second numbers of cycles of said ac signal.

* * * * *